United States Patent
Lowe et al.

(10) Patent No.: US 7,039,647 B2
(45) Date of Patent: May 2, 2006

(54) DRAG AND DROP TECHNIQUE FOR BUILDING QUERIES

(75) Inventors: Robert P. Lowe, Austin, TX (US); Gary Louis Macomber, Hutto, TX (US); Richard Walton Ragan, Jr., Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 09/852,829

(22) Filed: May 10, 2001

(65) Prior Publication Data

US 2002/0169768 A1 Nov. 14, 2002

(51) Int. Cl.
*G06F 17/30* (2006.01)

(52) U.S. Cl. .............. 707/102; 707/3; 707/4; 707/6; 707/104.1

(58) Field of Classification Search ............ 707/3, 707/4, 10, 6, 102, 104, 104.1; 715/700, 968, 715/764, 853, 854, 841, 769, 770
See application file for complete search history.

(56) References Cited

U.S. PATENT DOCUMENTS

| | | | | |
|---|---|---|---|---|
| 5,428,776 A | | 6/1995 | Rothfield | .............. 395/600 |
| 5,461,710 A | * | 10/1995 | Bloomfield et al. | ........ 715/839 |
| 5,579,471 A | * | 11/1996 | Barber et al. | ............... 715/700 |
| 5,761,656 A | | 6/1998 | Ben-Shachar | ................. 707/4 |
| 5,819,273 A | * | 10/1998 | Vora et al. | .................... 707/10 |
| 5,909,678 A | | 6/1999 | Bergman et al. | .............. 707/4 |
| 5,913,205 A | * | 6/1999 | Jain et al. | ..................... 707/2 |
| 6,188,405 B1 | * | 2/2001 | Czerwinski et al. | ........ 715/764 |
| 6,490,581 B1 | * | 12/2002 | Neshatfar et al. | ............. 707/4 |
| 6,567,846 B1 | * | 5/2003 | Garg et al. | ................. 709/218 |
| 6,728,693 B1 | * | 4/2004 | Lautzenheiser et al. | ........ 707/1 |

OTHER PUBLICATIONS

Wlodek Kubalski, Robert Field, Terry Chou, Michel Adar, ObjectWorks Interaction Model_Integrating Multiple Views, 1993, p. 176-182.*

Siau et al, "Visual Knowledge Query Language", IEICE Transactions on Information and Systems, Institute of Electronics information and Comm. Eng. Tokyo, JP, vol. E75—D, No. 5, Sep. 1, 1992, pp. 697-703.

* cited by examiner

*Primary Examiner*—Cam-Y Truong
(74) *Attorney, Agent, or Firm*—Duke W. Yee; Jeffrey S. LaBaw; Betty Formby

(57) ABSTRACT

A method, system and computer program product for building a search query in a data processing system having a graphical user interface is provided. Responsive to user input, a graphical component representing a first system object is dropped onto a graphical component representing a query function. A set of attributes of the first system object is presented. Responsive to user selection, a search query is created from the selected set of attributes.

14 Claims, 6 Drawing Sheets

DRAG AND DROP TECHNIQUE FOR BUILDING QUERIES

BACKGROUND OF THE INVENTION

1. Technical Field

The present invention relates to an improved data processing system. More particularly, the present invention provides a method and system for building queries and, still more particularly, a method and system for building queries using a drag and drop technique.

2. Description of Related Art

Many data processing systems take advantage of distributed processing by using a client/server architecture. In this architecture, the database is divided into two parts: a front-end or a client portion, and a back-end or a server portion. The client portion concentrates on requesting, processing, and presenting data managed by the server portion. The server portion runs server software and handles the functions required for concurrent, shared data access. Of course, the client-server architecture can be distributed across a network. For example, each of the client applications may be executed at a different node of the network, while one or more other nodes on the network are used for storing the database and executing the server software to process database requests sent by users at the client nodes.

To request data from a database, a client application may have a query written in any number of programming languages. One such language is the industry standard Structured Query Language(SQL) defined by the International Standards Organization (ISO). In response to executing the client application, the client will cause the server portion to perform the required operations on the information in the database.

Queries can be built manually from typing SQL commands or using graphical user interfaces (GUIs) to select conditions, their associated values and the logical expressions that form the query sequence. Once built, the query is run and the results of the query are returned so that a user can act upon the results. Typically queries are run in order to reduce a very large population of data down to a much smaller, or manageable population of data.

However, building queries from GUIs can be difficult and time consuming. Typically, the user has to understand the properties of the object such as an Internet Protocol (IP) address or a machine type, and then build a series of statements using logical operators such as AND, OR, NOT, and LIKE to reduce the query results to a manageable query results set. Typically, many end users of computer systems are not highly skilled in the art of programming and technical logic. The end user's main goal is to accomplish a task rather than to understand the underpinnings of an application or program. The more a design matches well-established principles of dragging and dropping and selecting highly recognizable attributes of objects, the higher the likelihood that the user will be able to understand and complete the task at hand. Therefore, the use of SQL logic to conduct a search is an abstract notion to many end users. The use of SQL logic often inserts itself between the steps of planning what objects the user is attempting to match and the steps of actually carrying out the search for those attributes. As a result, when an end user does not understand SQL, the end user is often forced to either run a simple search that may return too many objects or spend valuable time attempting to learn the aspects of a SQL search. There exists a need for allowing a user to build a query, not by having to enter SQL type commands or even to use GUI controls to build a query syntax, instead by a user being able to use a simpler and more efficient technique.

Therefore, it would be advantageous to have a method and system for building a query using a simple drag and drop technique.

SUMMARY OF THE INVENTION

The present invention provides a method, system and computer program product for building a search query in a data processing system having a graphical user interface. Responsive to user input, a graphical component representing a first system object is dropped onto a graphical component representing a query function. A set of attributes of the first system object is presented. Responsive to user selection, a search query is created from the selected set of attributes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
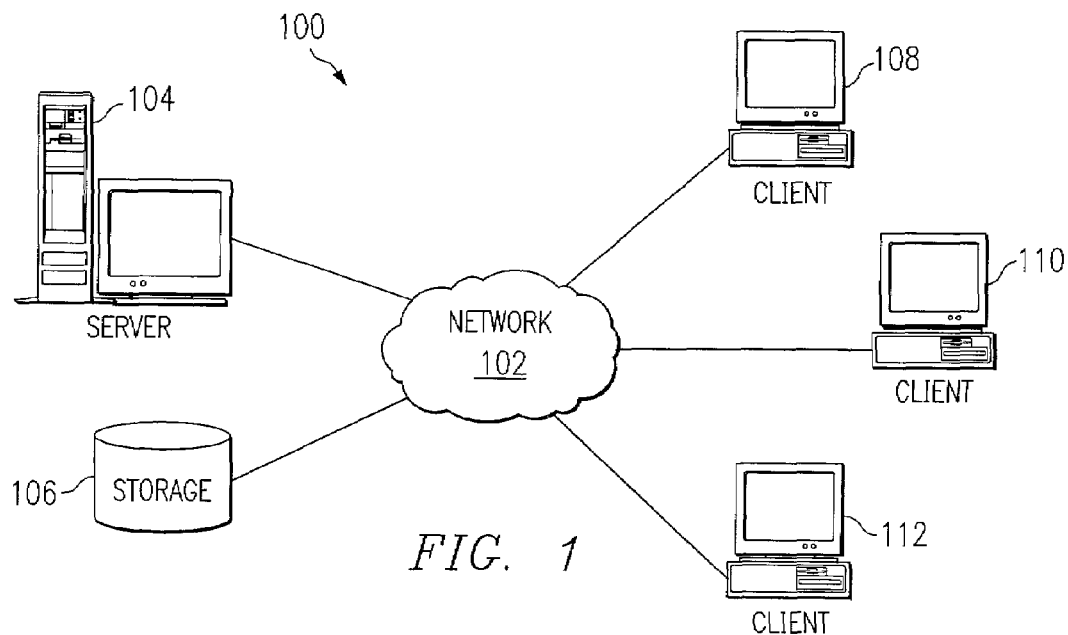
FIG. 1 is a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
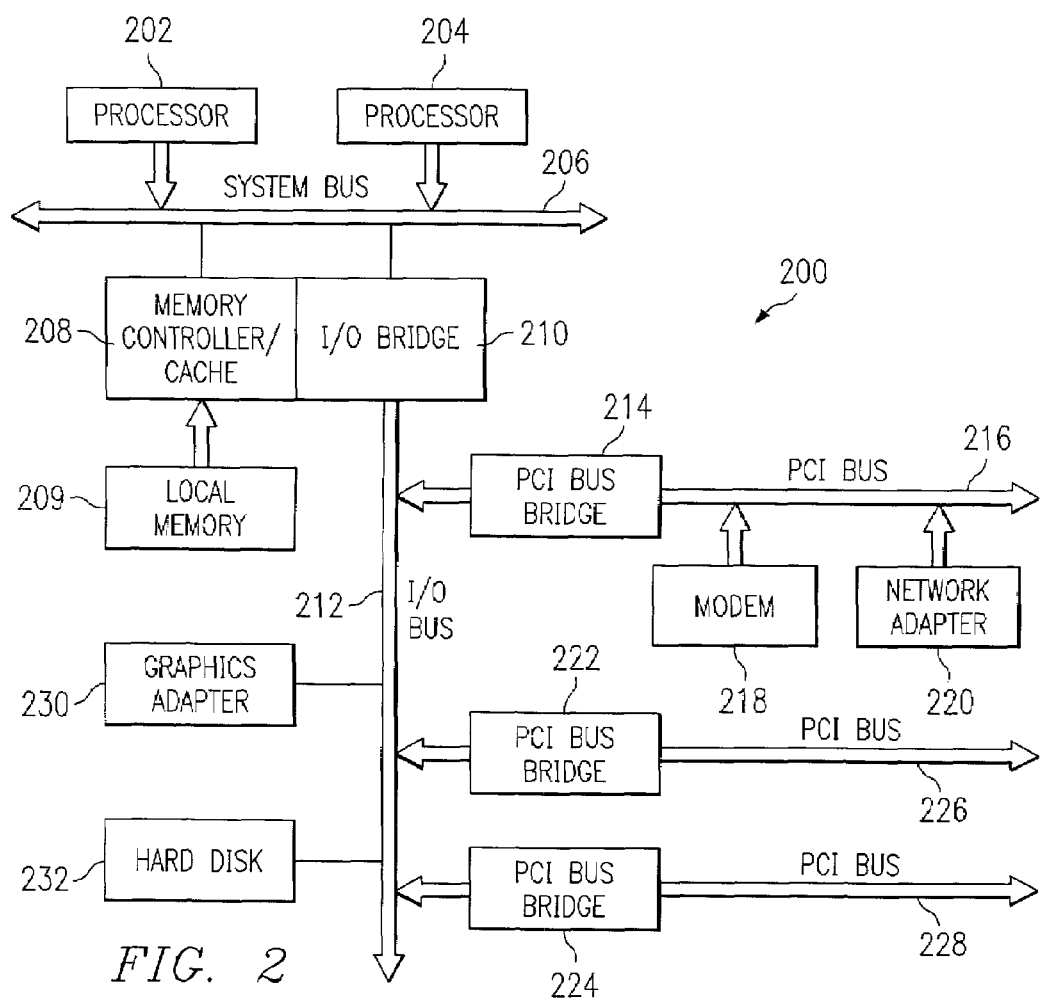
FIG. 2 is a block diagram of a data processing system that may be implemented as a server in accordance with a preferred embodiment of the present invention.

FIG. 2 is a block diagram of a data processing system that may be implemented as a server in accordance with a preferred embodiment of the present invention. FIG. 2 may be implemented as a server, such as server 104 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) or Linux operating system.

Figure 3:
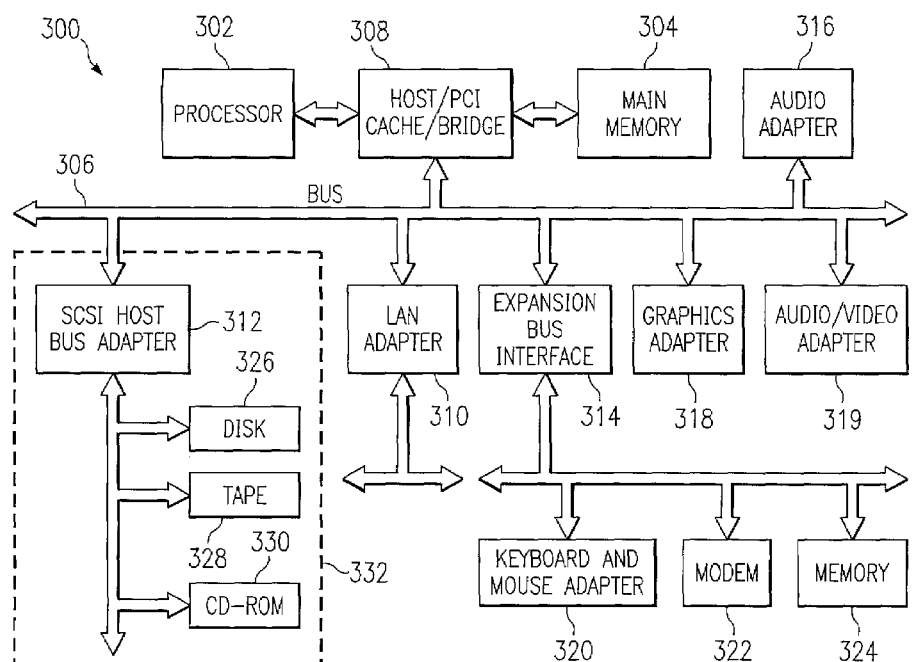
FIG. 3 is a block diagram illustrating a data processing system in which the present invention may be implemented.

FIG. 3 is a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA)

device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method for building queries using a drag and drop technique. An empty folder may be created. Objects may be located by find or navigation techniques. These located objects are dropped into the empty folder. Once complete, specific objects may be selected and may indicate which particular type of object is needed for further investigation.

For example, a folder named "hard to manage workstations" may be created. A search for workstations that are known to experience problems may begin. Problematic workstations may be dragged and dropped into the folder named "Hard to manage workstations". An object may be selected within the folder by, for example, right clicking on the object with an input device, such as, for example a mouse, and indicating that this object is used as a "template." A GUI may ask for which property of the selected object is to be used for a query. For example, the operating system of the selected object may be chosen. A "build query" option may then be chosen. Software associated with the present invention may then search, for example, each server or each managing server and locate every machine that has the same operating system as the selected object and populate the folder with, for example, all workstations which have that particular operating system on them. Increasingly more complex queries may be built with the present invention by continuing to add other objects into the folder. Furthermore, selecting other properties of those collected objects as desired may be used to build additional queries.

Figure 4:
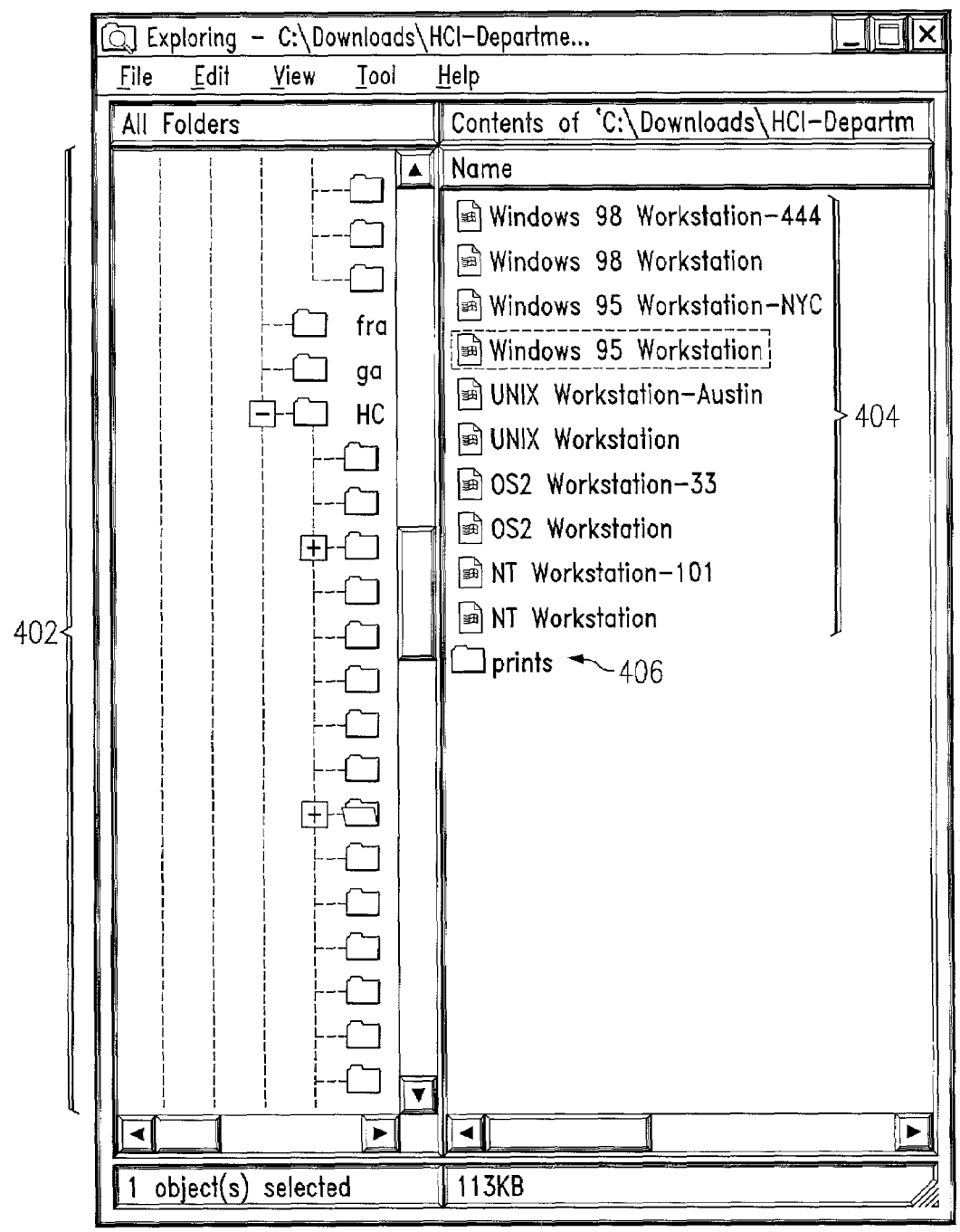
FIG. 4 is an exemplary list of objects in accordance with a preferred embodiment of the present invention.

FIG. 4 is an exemplary list of objects in accordance with a preferred embodiment of the present invention. A directory tree, such as directory tree 402, may contain a large number of folders. Inside each folder within directory tree 402, may be, for example files 404 associated with each particular folder or additional folders, such as, for example "prints" folder 406. In the prior art, searching each folder within directory tree 402 may be difficult and further difficulty may be encountered when a specific characteristic is needed for files within each folder. However, the present invention is directed toward solving this problem as discussed in detail below.

Figure 5:
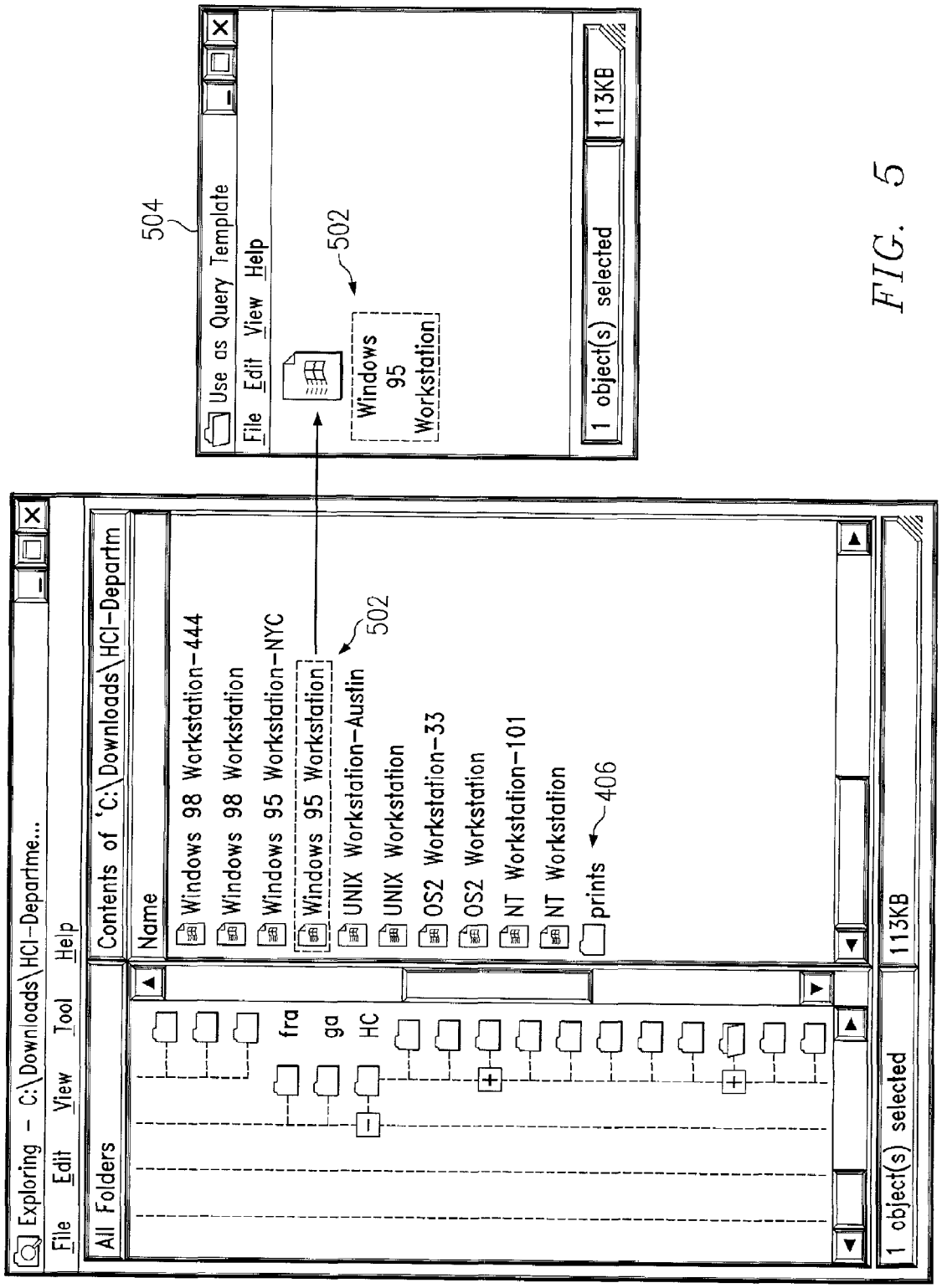
FIG. 5 shows an object chosen with a drag and drop technique from the list of objects in FIG. 4 in accordance with a preferred embodiment of the present invention.

FIG. 5 shows an object chosen with a drag and drop technique from the list of objects in FIG. 4 in accordance with a preferred embodiment of the present invention. To avoid the difficulties associated with searching each folder individually or using, for example, an SQL command to search directory tree 402 in FIG. 4, a file within a folder may be, for example, dragged and dropped into a query template, such as, for example, query template 504. In this example "Windows 95 Workstation" file 502 has been dragged and dropped into query template 502.

Figure 6:
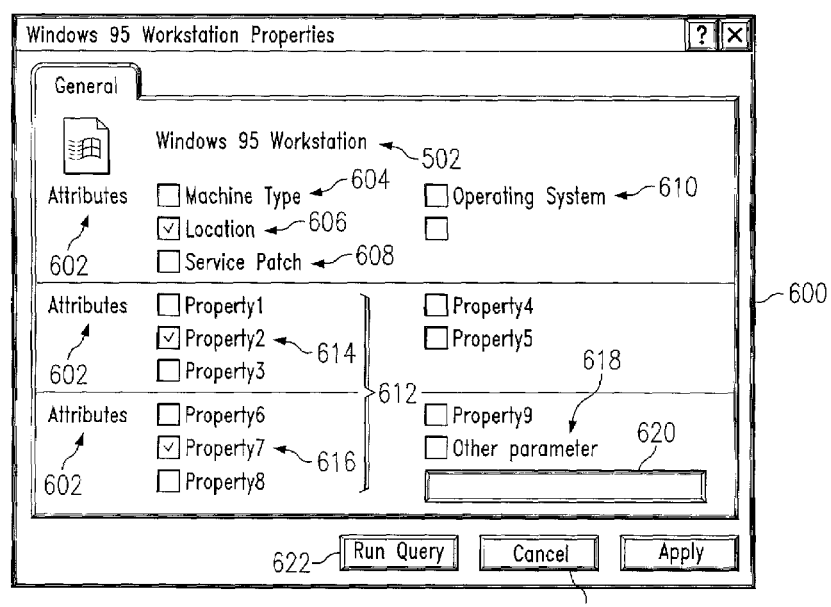
FIG. 6 is an exemplary graphical user interface (GUI) presenting a choice of properties for a query search in accordance with a preferred embodiment of the present invention.

FIG. 6 is an exemplary graphical user interface (GUI) presenting a choice of properties for a query search in accordance with a preferred embodiment of the present invention. After being inserted into a query template either by, for example, a drag and drop technique as shown in FIG. 5, properties of the file may be presented. Properties of the file may be presented in, for example, Windows 95 Workstation Properties display 600. Windows 95 Workstation Properties display 600 may consist of a file name, such as Windows 95 Workstation file 502 chosen in FIG. 5. In addition, Windows 95 Workstation Properties display 600 may include attributes associated with Windows 95 Workstation 502 from which a user may select attributes that in turn generate a query. The query compares all attributes selected by the user to match attributes of objects in a system. The query may, for example search within a folder, search within a network, search within an organizations' machines, and the like. Attributes which are matched based on the comparison are returned to be included in, for example, query template 504 in FIG. 5. In this example, attributes 602 contain features such as machine type 604, location 606, service patch 608 and operating system 610. In this example, location 606 has been selected by the user to be included in the query.

Furthermore, attributes 602 may include a variety of properties, such as properties 612, which may be associated with Windows 95 Workstation 502. As with machine type 604, location 606, service path 608 and operating system 610, these properties are properties which may be associated with Windows 95 Workstation 502. The other parameter 618 attribute allows the user to identify an unlisted property in the open dialog box 620 to be associated with Windows 95 Workstation 502. In this example, Property2 614 and Property7 616 have been chosen to be included in the query. Praperty2 614 and Property7 616 may be, respectively, for example, a specific version of an application and a certain subsystem component, defining a certain problem associated with, for example, Windows 95 Workstation 502, and the like. Once attributes 602 are selected for Windows 95 Workstation 502, a query may be executed by selecting "run query" virtual button 622 or "Windows 95 Workstation Properties" 600 may be canceled by selecting cancel virtual button 624. Although FIG. 6 has shown one specific implementation of presenting a choice of properties for a query search, alternative panels may also be used. For example, a first sample panel may be presented with the most frequently used search terms. Selection of an "advanced" item may present additional panels presenting additional attributes of the object. Those skilled in the art would appreciate that other examples may be used in carrying out the processes of the present invention.

Figure 7:
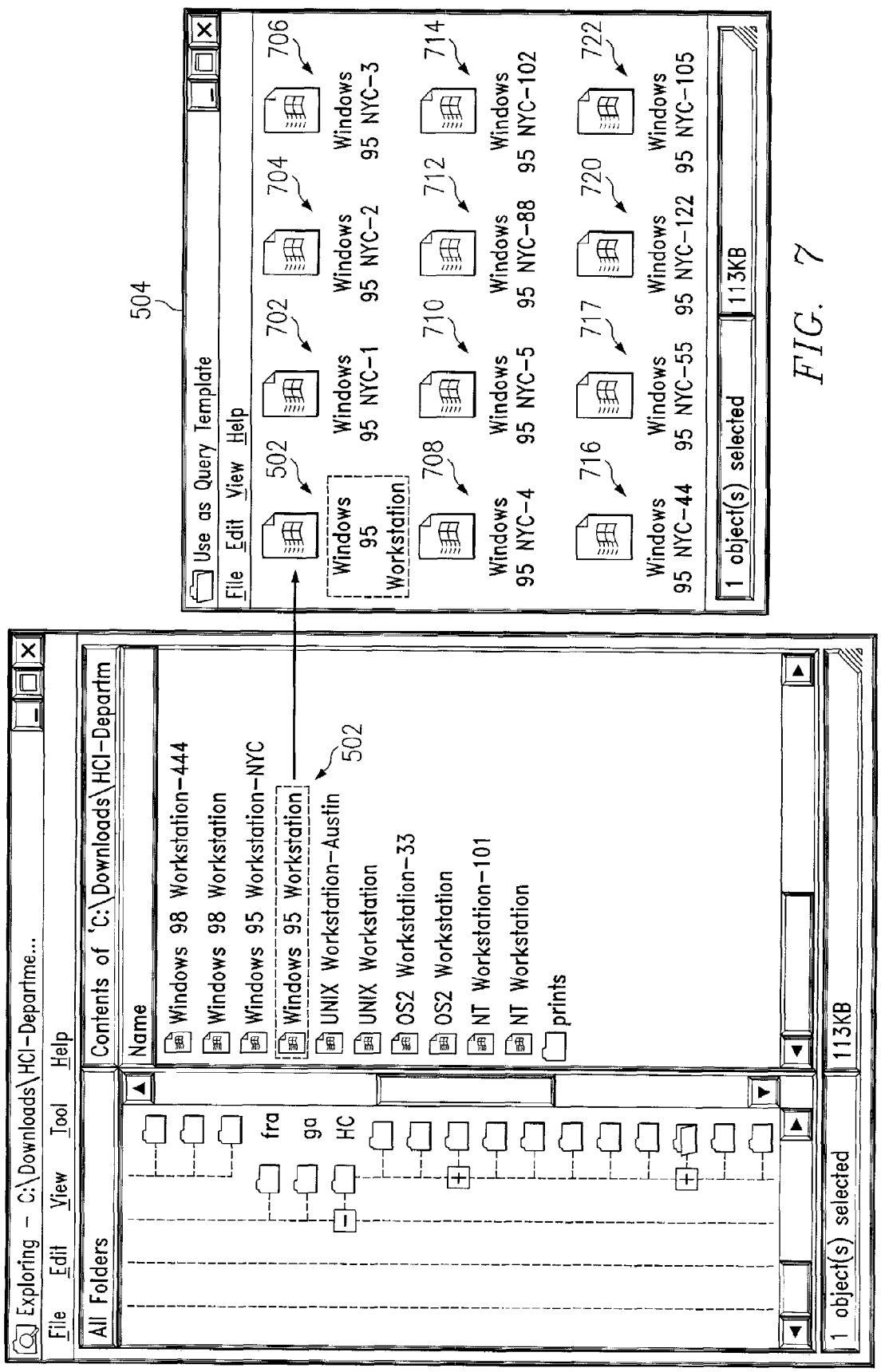
FIG. 7 shows results of a query search in accordance with a preferred embodiment of the present invention.

FIG. 7 depicts results of a query search in accordance with a preferred embodiment of the present invention. Results of the query may be inserted into a query template, such as, for example, query template 504 shown in FIG. 5. Query template 504 contains original Windows 95 Workstation file 502, either dragged and dropped or selected from a context menu from a list of objects. Entries 702–722 contain features similar to Windows 95 Workstation 502 as defined in "Windows 95 Workstation Properties" 600 in FIG. 6. With the use of the present invention only files containing features similar to those selected in the "Windows 95 Workstation Properties" panel 600 are included in query template 504.

In this example, Windows 95 Workstation 502 is selected to be included in the search query. Objects containing a specific attribute or attributes matching those in Windows 95 Workstation 502 may also be included in query template 504. For example, Windows 95 Workstation 502 may use, for example, a particular operating system. Once Windows 95 Workstation 502 is selected and a operating system used by Windows 95 Workstation 502 is specified, the search query will return objects also using, for example, the particular operating system. In this example, the search query has returned Windows 95 NYC-1 702, Windows 95 NYC-2

704, Windows 95 NYC-3 706, Windows 95 NYC-4 708, Windows 95 NYC-5 710, Windows 94 NYC-88 712, Windows 95 NYC-102 714, Windows 95 NYC-44 716, Windows 95 NYC-55 718, Windows 95 NYC-122 720 and Windows 95 NYC-105 722 which also use the particular operating system specified for Windows 95 Workstation 502 and these objects are included in query template 504. It should also be noted that Windows 95 Workstation 502 is also included in query template 504 because, of course, Windows 95 Workstation 502 also uses the specified operating system.

Figure 8:
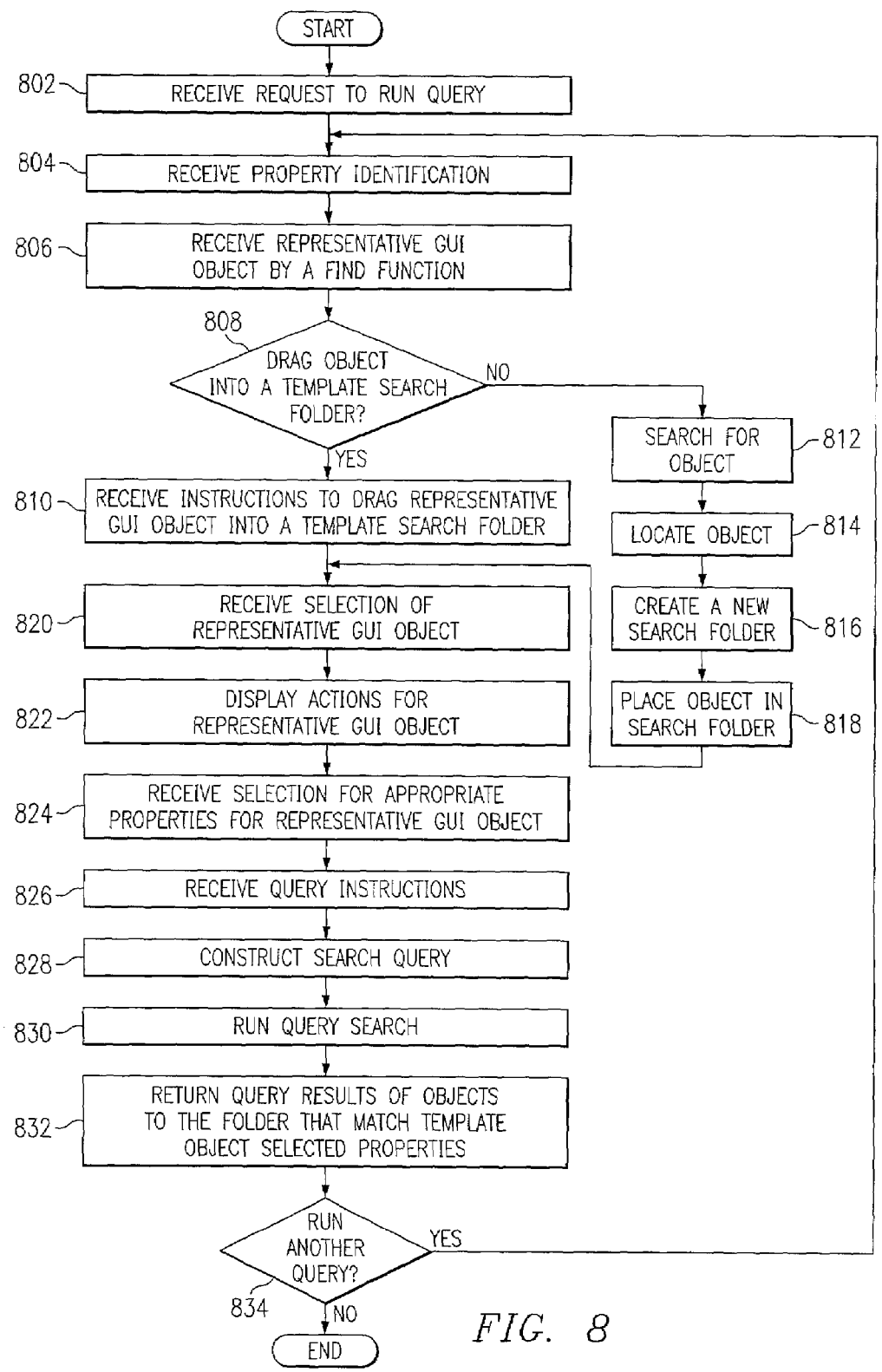
FIG. 8 is a flowchart illustrating an exemplary drag and drop technique for building queries in accordance with a preferred embodiment of the present invention.

FIG. 8 is a flowchart illustrating an exemplary drag and drop technique for building queries in accordance with a preferred embodiment of the present invention. In this example, the operation start by receiving a request to run a query (step 802). Then a property identification is received (step 804). A property identification may be a characteristic of a subsystem on a data processing system, a problem associated with a subsystem on a data processing system, and the like. Then a representative GUI object is received by a find function (step 806). The find function attempts to locate objects with a property or properties similar to the received property identification. Then a determination is made as to whether or not to drag an object into a template search folder (step 808). If an object is not to be dragged into a template search folder (step 808:NO), then a search for an object is performed. The object is then located (step 814). A new search folder is created (step 816) and the located object is placed in the search folder (step 818). Then the operation continues to step 820 in which a selection of a representative GUI object is received.

Returning to step 808, if the object is to be dragged into a template search folder (step 808:YES), then instructions are received to drag a representative GUI object into a template search folder (step 810). A selection of the representative GUI object is received (step 820). Properties are displayed for the representative GUI object (step 822). A selection is received for appropriate properties for the representative GUI object (step 824). Query instructions are received (step 826) and the search query is constructed (step 828). The query search is run (step 830). Query results of objects are returned to the folder that match the template object selected properties (step 832). Then a determination is made as to whether or not another query is to be run (step 834). If another query is not to be run (step 834:NO), the operation terminates. If another query is to be run (step 834:YES), the operation returns to step 804 in which a property determination is received.

Therefore, the present invention provides a method for building a query using a simple drag and drop technique. An object is located and then used as a reference so as to locate other objects within a data processing system containing similar characteristics. The object is dropped into a folder which is used as a template to locate the other objects with similar characteristics. A query is run and objects with similar characteristics are identified and also inserted into the folder. This process reduces the amount of time and knowledge of search techniques in which to locate objects with similar characteristics.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for building a search query in a data processing system having a graphical user interface, comprising the computer-implemented steps of:
  receiving a request to run a query and an attribute identification;
  receiving a representative graphical user interface object by a find function;
  determining whether said representative graphical user interface object has been dragged into a template search folder after receiving said request to run a query, said attribute identification, and said representative graphical user interface object;
  responsive to a determination that said representative graphical user interface object has been dragged into said template folder, receiving a user input from an input device;
  responsive to said user input, dropping a graphical component representing a first system object onto a graphical component representing a query function, wherein said first system object contains an attribute to create a search query;
  presenting a set of attributes of the first system object;
  receiving a user selection of at least one attribute in the set of attributes to create a selected set of attributes;
  receiving query instructions after receiving said user selection of the at least one attribute;
  responsive to receiving said user selection and receiving said query instructions, creating a search query from the selected set of attributes;
  running the created search query to obtain query results of objects; and
  returning the query results of objects to a results folder.

2. The method as recited in claim 1, further comprising the step of using the search query to assemble a set of system objects having attributes similar to the selected set of attributes.

3. The method as recited in claim 2, further comprising the step of defining a search scope for assembling the set of system objects.

4. The method as recited in claim 1, wherein the first system object represents the data processing system in a distributed computing environment.

5. A system for building a search query in a data processing system having a graphical user interface, comprising:
  a bus system;
  an input device connected to the bus system;
  a memory connected to the bus system, wherein the memory includes a set of instructions; and
  a processing unit connected to the bus system,
    wherein the processing unit receives a request to run a query and an attribute identification;
    the processing unit receives a representative graphical user interface object by a find function;

the processing unit determines whether said representative graphical user interface object has been dragged into a template search folder after receiving said request to run a query, said attribute identification, and said representative graphical user interface object, the processing unit responds to a determination that said representative graphical user interface object has been dragged into said template search folder and receives a user input from the input device;

the processing unit, responsive to receiving user input from the input device, executes the set of instructions to drop a graphical component representing a first system object onto a graphical component representing a query function, wherein said first system object contains an attribute to create the search query, the processing unit presents a set of attributes of the first system object, the processing unit receives a user selection of at least one attribute in the set of attributes to create a selected set of attributes, the processing unit receives query instructions after receiving said user selection of the at least one attribute;

the processing unit constructs a search query in response to receiving said user selection and receiving query instructions;

the processing unit runs the constructed search query to obtain query results of objects; and the processing unit returns the query results of objects to a results folder.

6. A system for building a search query in a data processing system having a graphical user interface, comprising:

means for receiving a request to run a query and an attribute identification;

means for receiving a representation graphical user interface object by a find function;

means for determining whether said representative graphical user interface object has been dragged into a template search folder after receiving said request to run a query, said attribute identification, and said representative graphical user interface object, means for receiving a user input from the input device responsive to a determination that said representative graphical user interface object has been dragged into said template search folder;

means, responsive to the user input, for dropping a graphical component representing a first system object onto a graphical component representing a query function, wherein said first system object contains an attribute to create a search query;

means for presenting a set of attributes of the first system object;

means for receiving a user selection of at least one attribute in the set of attributes to create a selected set of attributes; and means for receiving query instructions after receiving said user selection of the at least one attribute;

means for constructing a search query using the received query instructions and the received user selection;

means for running the constructed search query to obtain query results of objects; and returning means for returning the query results of objects to a result folder.

7. The system as recited in claim 6, further comprising means for using the search query to assemble a set of system objects having attributes similar to the selected set of attributes.

8. The system as recited in claim 7, further comprising means for defining a search scope for assembling the set of system objects.

9. The system as recited in claim 6, wherein the first system object represents the data processing system in a distributed computing environment.

10. A computer program product in a computer readable medium for building a search query in a data processing system having a graphical user interface, comprising:

instructions for receiving a request to run a query and an attribute identification;

instructions for receiving a representative graphical user interface object by a find function;

instructions for determining whether said representative graphical user interface object has been dragged into a template search folder after receiving said request to run a query, said attribute identification, and said representative graphical user interface object, instructions for receiving, responsive to a determination that said representative graphical user interface object has been dragged into said template search folder, a user input from a input device;

instructions, responsive to user input, for dropping a graphical component representing a first system object onto a graphical component representing a query function, wherein said first system object contains an attribute to create a search query;

instructions for presenting a set of attributes of the first system object;

instructions for receiving a user selection of at least one attribute in the set of attributes to create a selected set of attributes, instructions for receiving query instructions after receiving said user selection of the at least one attribute, and instructions for creating a search query using the received query instructions and the received user selection;

instructions for running the created search query to obtain query results of objects; and instructions for returning the query results of objects to a results folder.

11. The computer program product as recited in claim 10, further comprising instructions for using the search query to assemble a set of system objects having attributes similar to the selected set of attributes.

12. The computer program product as recited in claim 11, further comprising instructions for defining a search scope for assembling the set of system objects.

13. The computer program product as recited in claim 10, wherein the first system object represents the data processing system in a distributed computing environment.

14. A method in a data processing system for building a search query, the method comprising the computer-implemented steps:

receiving a request to run a query and a property identification;

receiving a representative graphical user interface object by a find function;

after receiving said request to run a query, said property identification, and said representative graphical user interface object, determining whether said representative graphical user interface object has been dragged into a template search folder;

responsive to a determination that said representative graphical user interface object has been dragged into said template search folder, receiving a selection of said representative graphical user object, wherein said representative graphical user interface object contains an property to create a search query;

responsive to said selection of said representative graphical user interface object, displaying a set of properties for said representative graphical user interface object;

receiving a selection of at least one of said set of properties for said representative graphical user interface object that form selected properties;

responsive to receiving said selected properties, receiving query instructions;

constructing a search query using the received query instructions;

running the constructed search query to obtain query results of objects; and returning the query results of objects to a results folder.

* * * * *